UNITED STATES PATENT OFFICE.

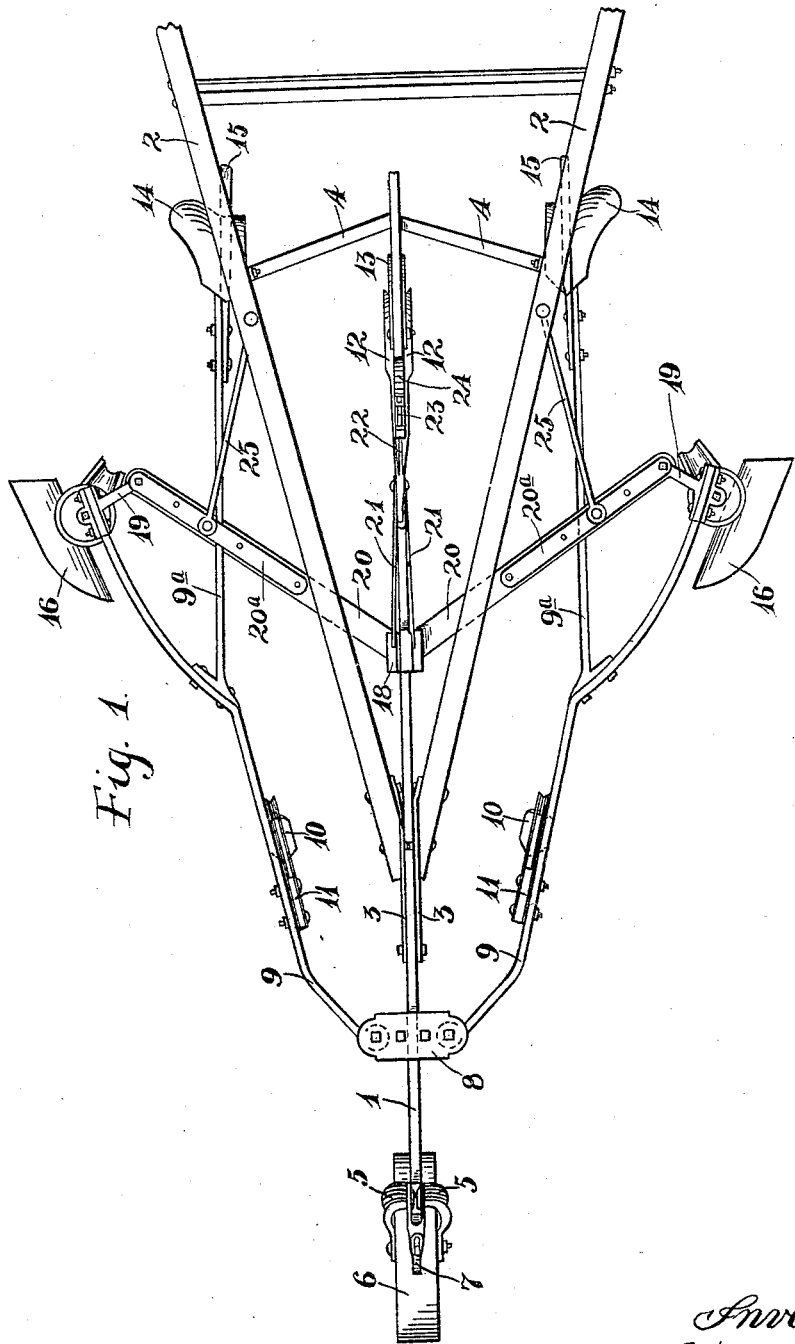

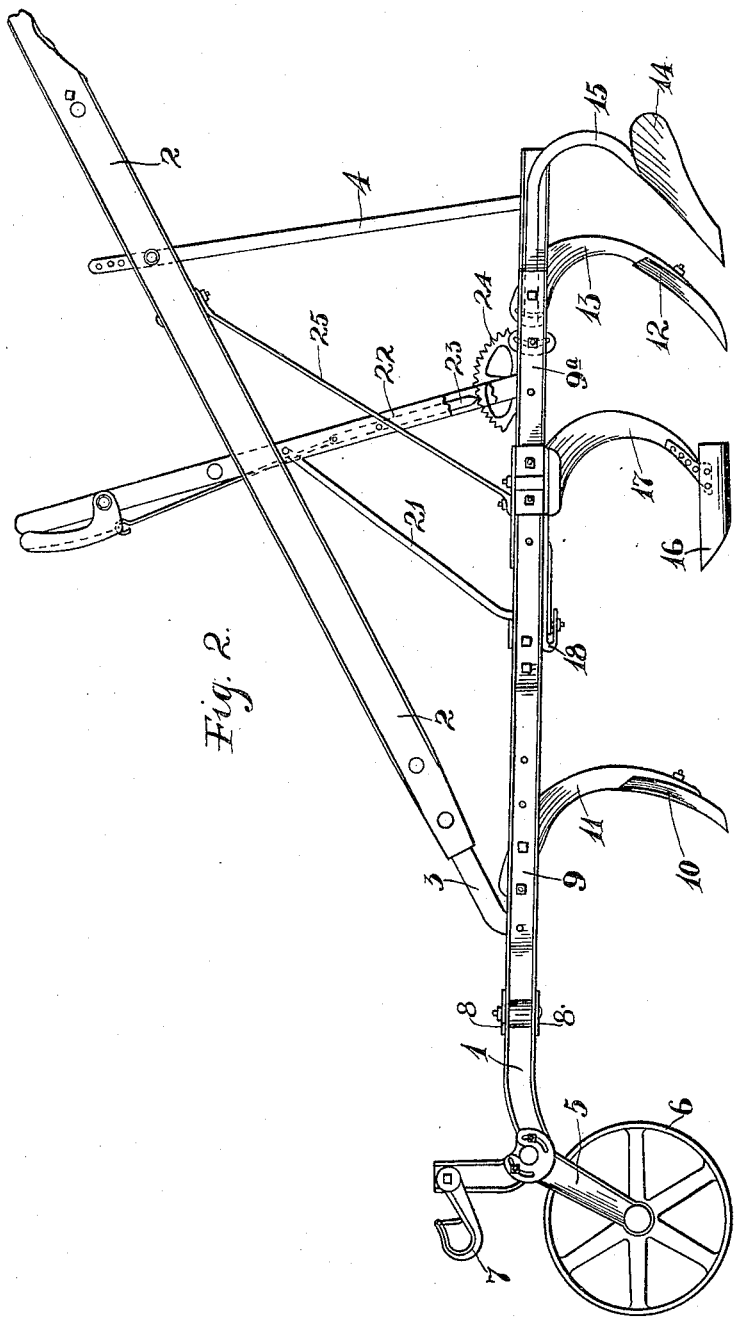

OCTAVE CARON, OF MONTGOMERY, MINNESOTA.

CULTIVATOR.

No. 909,149.      Specification of Letters Patent.      Patented Jan. 12, 1909.

Application filed February 18, 1907. Serial No. 357,791.

*To all whom it may concern:*

Be it known that I, OCTAVE CARON, a citizen of the United States, residing at Montgomery, in the county of Lesueur and State of Minnesota, have invented certain new and useful Improvements in Cultivators; and I do hereby declare the following to be a full, clear, and exact description of the invention, such as will enable others skilled in the art to which it appertains to make and use the same.

My invention relates to cultivators and especially to that class of cultivators which are provided with laterally adjustable hoes or plows, and to this end, it consists of the novel devices and combinations of devices hereinafter described and defined in the claims.

In the accompanying drawings, which illustrate the invention, like characters indicate like parts throughout the several views.

Referring to the drawings; Figure 1 is a plan view of the improved cultivator; and Fig. 2 is a side elevation of the same.

The framework of the cultivator comprises a relatively fixed central drag bar or beam 1 to which a pair of upwardly and rearwardly diverging handle bars 2 are rigidly secured, as shown, by extension straps 3 and brace straps 4.

To the forward end of the central beam or drag bar 1 is rigidly secured a wheel yoke 5 in which is journaled a ground wheel 6. Also, as shown, the extreme forward end of said bar 1 is turned upward and a suitable draft hook 7 is attached.

To the beam 1 rearward of the bracket 5 is rigidly secured a coupling head 8 constituting a part of said beam 1, and to each end of said coupling head 8 is pivotally attached a laterally adjustable drag bar 9. The drag bars 9 are diametrically arranged on opposite sides of the beam 1, and each drag bar is provided with a rigidly secured supplemental drag bar 9ª. Cultivating hoes or plows 10 are secured to the lower ends of arms 11, which, as shown, are rigidly secured to the drag bars 9 only a short distance rearward of their pivoted front ends. A similar hoe or plow 12 is secured to the lower end of a supporting arm 13, which, in turn, is rigidly secured to the rear end of the central beam or drag bar 1. Plows or cultivator hoes 14 are secured to arms 15, which, in turn, are rigidly connected to the rear ends of the supplemental drag bars 9ª. So-called weeding plows or blades 16 are rigidly secured to the lower ends of supporting arms 17. The arms 17 are rigidly but adjustably secured to the free ends of said drag bars 9 by any suitable means.

Mounted to slide on the rear portion of the central beam 1 is an adjusting head or block 18. On the free ends of the drag bars 9 are rigidly secured inwardly projecting brackets 19 to which the outer ends of a pair of adjusting links 20 are pivotally attached. The said adjusting links 20 are pivotally connected at their inner ends to the adjusting head 18 and constitute a toggle by the closing and opening movements in which the drag bars 9—9ª are adapted to be adjusted laterally with respect to each other and with respect to the central beam 1. The sliding head 18 is connected by a link 21 to the intermediate portion of a latch lever 22, which latch lever is pivoted to the rear portion of the central beam 1, and is provided with a latch 23 that coöperates with a relatively fixed latch segment 24 on said beam 1, to hold the said lever and, hence, said block 18 and drag bars 9—9ª in any set adjustment.

The numeral 25 indicates oscillatory fulcrum bars or rods which at their rear ends are pivotally attached to the handle bars 2, and at their forward ends are pivotally attached to the intermediate portions of the toggle acting links 20. The said toggle links, therefore, may be pivotal on the free ends of the fulcrum rods or bars 25 and the latter oscillate so as to follow the inward and outward movements of the said bars 20.

As is evident, when the lever 22 is moved rearward, the drag bars 9 are moved farther apart, and when the said lever is moved forward, the said drag bars are moved nearer together. As best shown in Fig. 1, the toggle acting links 20 are provided with upwardly spaced but rigidly secured keeper straps 20ª that overlie the supplemental drag bars 9ª and thus retain the said supplemental bars between the corresponding links 20 and keeper straps 20ª.

What I claim is:

1. In a machine of the kind described, the combination with hoe or plow-equipped central beam, of handle bars rigidly secured thereto, and an adjusting head slidably mounted on said beam, a latch arch on the rear portion of said beam, a latch lever coöperating therewith and connected to said adjusting head, hoe or plow-equipped drag bars and means for connecting the same to the central beam, toggle acting links pivotally connected to said adjusting head and provided with guide straps between which and the said toggle acting links the drag bars work laterally, and means for connecting the free ends of said toggle acting links to the handle bars, substantially as described.

2. In a machine of the kind described, the combination with a hoe or plow equipped central beam, of handle bars rigidly secured thereto, an adjusting head slidably mounted on said central beam, a latch arch on the rear portion of said beam, a latch lever coöperating therewith and connected to said adjusting head, hoe or plow equipped main drag bars pivotally attached to said central beam at their forward ends, plow or hoe equipped supplemental drag bars rigidly secured to the respective main drag bars, toggle acting links pivotally connecting the free ends of said main drag bars to said adjusting head and provided with guide straps between which and the said toggle acting links the supplemental drag bars work laterally, and oscillatory fulcrum links pivotally connecting the intermediate portions of said toggle acting links to said handle bars, substantially as described.

In testimony whereof I affix my signature in presence of two witnesses.

OCTAVE CARON.

Witnesses:
MALIE HOEL,
F. D. MERCHANT.